Patented Sept. 16, 1952

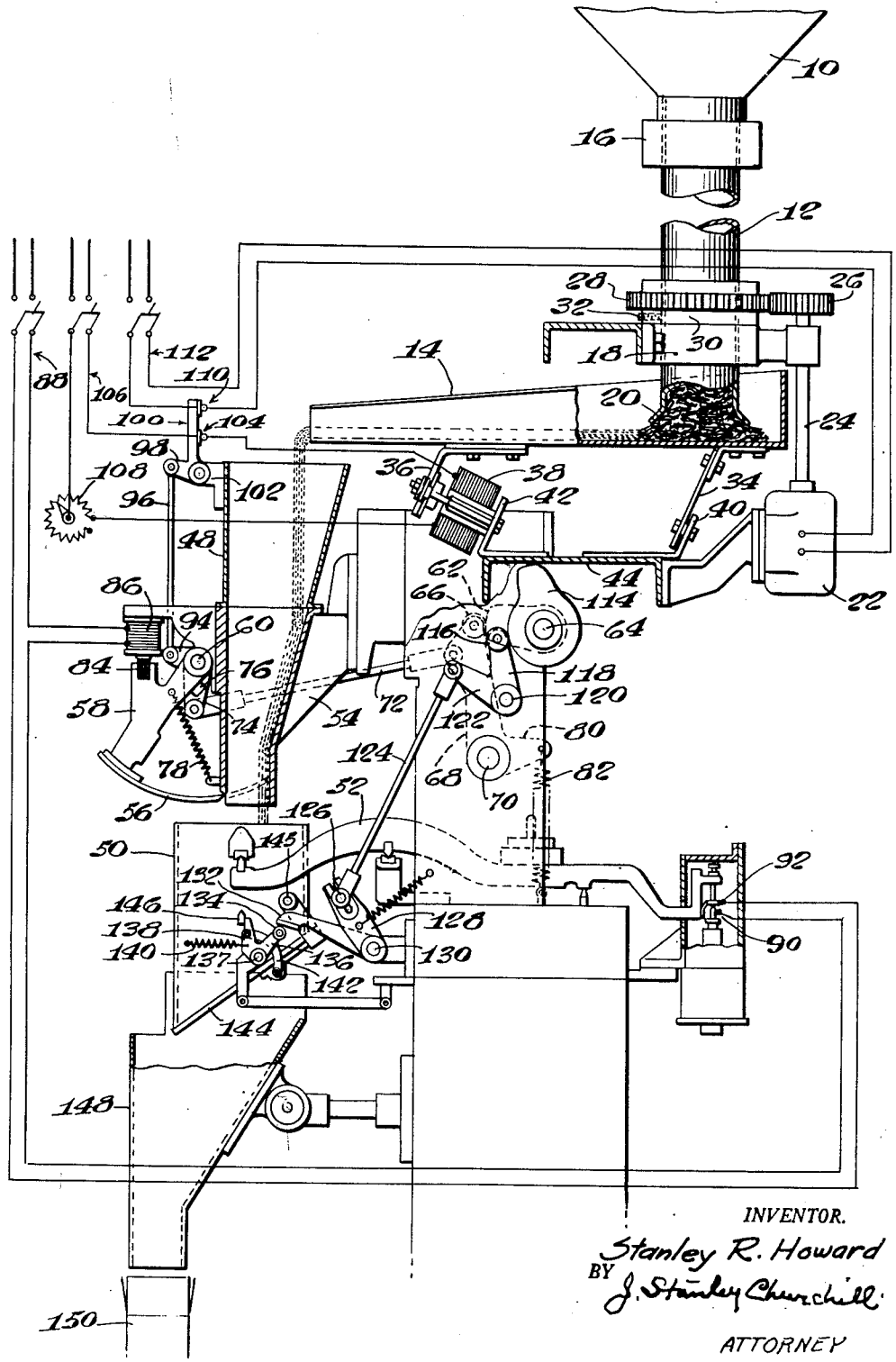

2,610,726

UNITED STATES PATENT OFFICE 2,610,726

MATERIAL FEEDING CONVEYER

Stanley R. Howard, Milton, Mass., assignor to Pneumatic Scale Corporation, Limited, Quincy, Mass., a corporation of Massachusetts Application July 1, 1949, Serial No. 102,471

5 Claims. (Cl. 198—62)

This invention relates to a packaging machine and more particularly to a material feeding mechanism for a packaging machine.

The invention has for an object to provide a novel and improved packaging and particularly weighing machine embodying a novel material feeding mechanism particularly adapted for feeding certain materials of a light weight, fragile and irregularly shaped nature, to the end that such materials may be efficiently and economically fed in a uniform stream and in a manner such as to effect a substantially uniform withdrawal of material from a supply thereof with minimum breakage.

With this general object in view and such others as may hereinafter appear, the invention consists in the packaging machine and in the material feeding mechanism therefor, and in the various structures, arrangements and combinations of parts hereinafter described and particularly defined in the claims at the end of this specification.

The drawing shows, in side elevation and partly in cross-section, a weighing machine embodying the present invention.

In general, the present invention contemplates a packaging machine, herein shown as a weighing machine, embodying material feeding apparatus particularly adapted for efficiently feeding materials comprising irregularly shaped light weight particles of a brittle or fragile nature which have a tendency to intermesh or become tangled and which have heretofore been difficult to feed with any substantial degree of uniformity or without excessive breakage of the fragile particles by prior feeding mechanisms of which I am aware. The illustrated material feeding apparatus includes a substantially horizontally disposed vibratory feed trough or conveyer arranged to receive the material by gravity from a source of supply through a substantially vertically disposed supply conduit forming a vertical column of the material with the bottom of the column resting or being supported on one end of the horizontal vibratory trough. In operation, the vibration of the horizontal trough effects shearing of the material from the bottom of the supply column to advance the material uniformly along the conveyer to be delivered in a uniform stream from the discharge end of the vibratory conveyer into a weighing receptacle or other container.

Provision is also made for imparting a rotary movement to the material supply conduit during the vibration of the feed conveyer, thus gently loosening and untangling the material from its intermeshed condition with minimum breakage of the particles and effecting a substantially uniform withdrawal of material from the supply conduit into the conveyer and assuring maximum uniformity in the stream being discharged into the weighing receptacle or other container by the operation of the vibratory feed trough.

The vertical supply conduit preferably has a relatively smooth interior surface free of grooves or projections which might tend to force the material out of the conduit, and the conduit is rotated relatively slowly, approximately in the order of 50 to 60 revolutions a minute, so that in operation, the material emerging from the mouth of the conduit is caused to rotate along with the conduit, thus spreading the material evenly and permitting any intermeshed particles to be released and advanced along the feed conveyer. In practice, it was discovered that the foregoing operation effects a gentle and gradual spiralling movement of the column in the conduit, the relatively smooth interior surface of the conduit effecting slippage of the column thus avoiding any abrupt twisting or grinding movement in the column of material and as the head pressure is increased when the material approaches the lower end of the column, less relative slippage occurs so that the lower end of the column is rotated at substantially the same rate as the conduit in a smooth and gentle manner without grinding or breakage of the fragile particles.

Provision is also made in the preferred embodiment of the invention for initiating rotation of the material supply conduit and vibration of the material feeding conveyer at the start of a cycle of operation of the packaging machine and for controlling the operation thereof to effect termination of the rotation and vibration respectively when a predetermined amount of material has been deposited into the receptacle, as will be hereinafter more fully described.

Referring now to the drawings, the present invention is herein shown as embodied in an automatic weighing machine of the type illustrated and described in the United States Patent to Stanley R. Howard, No. 2,151,107, dated March 21, 1939, to which reference may be had and which is adapted to handle, weigh and package flowable solid material in a rapid and accurate manner. In the illustrated embodiment of the invention, 10 represents a storage hopper for the bulk supply of material to be weighed and packaged and from which the material flows by gravity through a vertically disposed rotary conduit 12 onto one end of a vibratory material feeding conveyer 14. As herein shown, the vertical supply conduit 12 may be rotatably supported in upper and lower bearing members 16, 18 attached to the machine frame and in which the supply conduit may be adjusted vertically relative to the horizontally disposed feed conveyer 14 for varying the distance from the open end or mouth of the conduit to the bottom of the conveyer to obtain the most efficient flow of the material therefrom. The lower end of the rotary conduit 12 may and preferably will be provided with an outwardly flared mouth portion 20 as shown, to facilitate release and uniform distribution of the material emerging from the conduit.

The vertically disposed cylindrical supply conduit 12 is arranged to be rotated through connections from a motor 22, the motor shaft 24 being provided with a pinion 26 arranged to mesh with a gear 28 secured to the conduit 12, as shown. The gear 28 rests against the upper surface of the bearing member 18 and the hub 30 of the gear may be provided with a set screw 32 to permit vertical adjustment of the rotary conduit in the bearing members.

The material feeding conveyer 14 is arranged to be vibrated to advance the material along the conveyer to be delivered from the discharge end thereof in a uniform stream. As herein shown, the feeding conveyer 14 is mounted to vibrate through connections including a thin steel strap 34 at one end and through a second strap 36 at the other end connected to an electrically operated vibratory motor 38 of any usual or preferred structure. The vibratory unit is mounted on angle straps 40, 42 secured to a channel iron base 44 attached to the machine frame.

Provision is made for initiating rotation of the supply conduit 12 and vibration of the feed conveyer 14 at the start of each cycle of operation, as will be hereinafter described, to deliver the material first through a funnel 48 and then into a weighing receptacle or bucket 50 mounted upon one end of a scale beam 52, and provision is made for terminating the rotation and vibration respectively, and for cutting off the supply of material through the funnel 48 by mechanism controlled by the movement of the scale beam 52 when the scale has made its weight. As herein shown, the funnel 48 is adjustably mounted upon a bracket 54 attached to the machine frame and is disposed to receive the material from the discharge end of the conveyer 14 and to guide the material into the receptacle 50.

The funnel 48 is provided with a shutter 56 mounted upon an arm 58 loosely pivoted upon a shaft 60 journaled in suitable bearings secured to the funnel 48.

When the shutter 56 is closed at the end of a weighing cycle to cut off the stream of material, any surplus material discharged by the feed conveyer 14 is accumulated in the funnel to be released into the weighing receptacle 50 at the start of a succeeding cycle of operation. As herein shown, provision is made for opening the shutter 56 at the beginning of each cycle of operation of the machine by a cam 62 secured to a cam shaft 64 and through connections including a cooperating cam roll 66 mounted on a cam lever 68 pivotally mounted on a shaft 70. The lever 68 is connected by a link 72 to an arm 74 loosely mounted on the shaft 60 and provided with an extension 76 arranged to engage the shutter arm to effect rocking of the shutter to its open position. The shutter arm is normally urged into its closed position by a spring 78 connected between the arm and the funnel. The cam lever 68 is provided with a second arm 80 connected by a spring 82 to the machine frame, for holding the cam roller 66 against its cam. The cam shaft 64 forms a part of the automatic weighing machine illustrated in the Howard Patent No. 2,151,107, above referred to, and as therein more fully described, is arranged to make one revolution each weighing cycle and is controlled to prevent initiation of a succeeding cycle until the instant weighing cycle is completed.

Provision is made for retaining the shutter 56 in its open position during the weighing period and for releasing the shutter to cut off the stream when a predetermined weight of material has been introduced into the receptacle 50, and as herein shown, the arm 58 is provided with the movable member or armature 84 of an electromagnet 86. The electromagnet 86 forms part of an electrical circuit indicated generally at 88 and is connected in series with a contact member 90 arranged to cooperate with a contact member 92 carried by the counterweight end of the scale beam. Thus, in operation, when the scale beam 52 is in weighing position, as illustrated, the contacts 90, 92 are closed to energize the electromagnet 86 and retain the shutter in its open position and when the scale beam makes its weight, the circuit is opened at the contacts 90, 92 and the electromagnet is deenergized thereby freeing the shutter arm 58 and permitting the spring 78 to rock the shutter 56 to its closed position.

Provision is also made for initiating the rotation of the supply conduit 12 and vibration of the feed conduit 14 upon opening of the shutter 56 at the beginning of each cycle of operation and for terminating such movement upon closing of the shutter 56 at the end of the weighing period of operation, and as herein shown, the shutter arm 58 is provided with an arm 94 formed integrally therewith and connected by a link 96 to an arm 98 forming part of a switch 100 pivotally mounted in a bracket 102 attached to the funnel 48. The switch 100 is provided with one pair of contacts 104 arranged to close a circuit 106 connected to the vibratory motor 38. The circuit 106 also includes a rheostat 108 which can be adjusted to vary the amount of material delivered from the feed conveyer 14. The switch 100 is provided with a second pair of contacts 110 arranged to close a circuit 112 connected to the electric motor 22. Thus, in the operation of the machine, when the shutter arm 58 is rocked to its open position by the cam 62, the circuits 106, 112 to the vibratory motor 38 and the electric motor 22 respectively will be closed by contacts 104, 110 to start vibration of the conveyer 14 and rotation of the supply tube 12 and conversely, when the shutter is permitted to rock to its closed position by movement of the scale beam when the scale has made its weight, the circuits 106, 112 will be opened to discontinue movement of the feed conveyer and the supply tube.

When the scale beam has made its weight and feeding of the material has been discontinued as above described, provision is made for dumping the material from the weighing receptacle 50 and, as herein shown, this may be accomplished by a cam 114 fast on the cam shaft 64 and arranged to cooperate with a cam roller 116 carried by one arm 118 of a bell crank pivotally mounted at 120. The second arm 122 of the bell crank is connected by a link 124 and by an adjustable connection 126 to a lever 128 fast on a cross shaft 130 journaled in suitable brackets attached to the machine frame. The cross shaft 130 is provided with a gate operating arm 132 also fast thereon which is arranged to cooperate with a roller 134 carried by one arm 136 of a bell crank pivoted at 137 upon the side of the weighing receptacle 50. The second arm 138 of the bell crank is urged in a counterclockwise direction by a spring 140 and is connected by a curved arm 142 to a gate 144 constituting the bottom of the receptacle. The gate 144 is pivoted at 145 to the side of the receptacle and the curved arm connection is disposed to form in effect a toggle lock when the gate is closed, the arm 138 resting against a fixed stop 146 on the side of the receptacle at this time. In operation, when the gate operating arm 132 engages the roller 134 it serves to break the toggle to effect opening of the gate, and as long as the arm 132 continues to bear against the roller 134, the gate remains open. When the operating arm is rocked back to its inoperative position the parts are returned to receptacle closing position by the spring 140. The weighed load of material released from the receptacle is guided through a chute or funnel 148 in a carton or other container 150 positioned therebeneath.

From the above description of the preferred construction and mode of operation of a packaging or weighing machine embodying the present invention it will be observed that the present material feeding mechanism is particularly adapted to handle and feed fragile and irregularly shaped materials in a smooth and gentle manner whereby to effect uniform withdrawal of material from the supply conduit and to obtain a uniform material feeding stream. It will also be observed that the gradually spiralling movement effected by rotation of the supply conduit together with the vibratory movement of the feed conveyer against the bottom of the column prevents bridging or clogging of the material across the conduit walls and effects a uniform release of the material from the conduit with minimum breakage of the fragile particles in a simple, efficient and economical manner.

In its preferred embodiment the invention contemplates the rotation of the supply conduit 12 during the feeding operation, but in some instances, other forms of rotary movement may be imparted thereto with advantageous results.

While the preferred embodiment of the invention has been herein illustrated and described, it will be understood that the invention may be embodied in other forms within the scope of the following claims.

Having thus described the invention, what is claimed is:

1. In a packaging machine, in combination, material feeding means comprising a vibratory material feeding conveyer, a material supply conduit having its delivery end terminating a short distance from the feeding conveyer, said supply conduit during the operation of the machine forming a column of material with the bottom of the column supported in said conveyer, and means for rotating the supply conduit to impart an axial rotary movement of the material emanating from the conduit while such material is simultaneously subjected to vibratory movement by said conveyer whereby to facilitate withdrawal of the material from the supply conduit.

2. In a packaging machine, in combination, material feeding means comprising a substantially horizontal vibratory material feeding conveyer, a substantially vertical material supply conduit forming a column of material with the bottom of the column in engagement with and supported by the vibratory conveyer, and means for rotating said supply conduit to impart an axial rotary movement to the material emanating from the conduit while subjecting the material to vibration by said conveyer whereby to facilitate withdrawal of material from the supply conduit.

3. In a packaging machine of the character described, in combination, material feeding means comprising a substantially horizontal vibratory material feeding conveyer, and a substantially vertical rotary supply conduit forming a column of material with the bottom of the column supported in the vibratory conveyer, the mouth of said conduit being spaced from the conveyer and having an outwardly flared lip portion and means for rotating said supply conduit, the rotary movement of the supply conduit imparting a gradual spiralling movement to the vertical column to cause the material emanating from the conduit to be gently rotated and evenly distributed radially from the mouth of the conduit while subjecting the material to vibration by said conveyer whereby to facilitate withdrawal of material from the supply conduit.

4. Material feeding means as defined in claim 1 wherein the conduit is rotated at a relatively slow rate of speed, and the conveyer is vibrated at a relatively high rate of vibration.

5. Material feeding means as defined in claim 1 including means for adjusting the supply conduit to vary the distance of the delivery end of the conduit from the feeding conveyer.

STANLEY R. HOWARD.

REFERENCES CITED

The following references are of record in the file of this patent:

UNITED STATES PATENTS

| Number | Name | Date |
|---|---|---|
| 797,144 | Nickerson | Aug. 15, 1905 |
| 1,083,979 | Voglesong | Jan. 13, 1914 |
| 2,101,561 | Rapp | Dec. 7, 1937 |
| 2,151,107 | Howard | Mar. 21, 1939 |
| 2,303,140 | Sacket | Nov. 24, 1942 |
| 2,333,435 | Muskat | Nov. 2, 1943 |
| 2,352,114 | Muskat | June 20, 1944 |